United States Patent [19]

Watanabe

[11] 4,157,832
[45] Jun. 12, 1979

[54] SIMPLIFIED STRUCTURE OF TOY PHONOGRAPH

[75] Inventor: Katsumi Watanabe, Kawasaki, Japan

[73] Assignee: Yugen Kaisha Watanabe Kenkyusho, Kawasaki, Japan

[21] Appl. No.: 846,520

[22] Filed: Oct. 28, 1977

[30] Foreign Application Priority Data

Jul. 18, 1977 [JP] Japan .................................. 52-85897

[51] Int. Cl.² .............................................. G11B 3/00
[52] U.S. Cl. .................................. 274/1 A; 274/9 R; 274/39 A
[58] Field of Search ................... 274/1 A, 9 R, 39 A, 274/39 R

[56] References Cited

U.S. PATENT DOCUMENTS

| | | | |
|---|---|---|---|
| 3,401,942 | 9/1968 | Strauss | 274/9 R |
| 3,740,056 | 6/1973 | Nuhall et al. | 274/1 A |
| 3,823,946 | 7/1974 | Nakajima | 274/1 A |

Primary Examiner—Richard E. Aegerter
Assistant Examiner—John W. Shepperd
Attorney, Agent, or Firm—Irving M. Weiner; Pamela S. Austin; Melvin Yedlin

[57] ABSTRACT

Disclosed is a simplified structure of a toy phonograph in which the output shaft of a motor is selectively put into engagement with the rim of a record disc to drive the latter. A tone arm is provided above the record disc, so that the record disc may be contacted by a stylus carried by the tone arm, when moved axially by the output shaft of the motor brought into driving engagement therewith. The motor is biased for pivotal movement into engagement with the record disc, by means of springs which are retained by terminals of the motor. The springs are made of a conductive and resilient material, for playing a role of lead wire for supplying the motor with power. The springs include a plus side and a minus side springs, one of which is adapted to be separated from the associated motor terminal in the course of the pivotal movement of the motor, to serve as a source switch. The tone arm is normally biased toward the starting point of reproduction, so as to be swung in a space between the record disc and a speaker. When the reproduction is over, the tone arm is displaced radially outwardly or inwardly of the record disc, so as to allow the axial movement of the record disc. During this axial movement the spring comes to be separated by the associated motor terminal to open the source circuit. As a manual switch is depressed, the record disc is lowered to allow the tone arm to return the central starting point of reproduction, and the spring which has been disconnected from the motor terminal is again brought into contact with the latter.

6 Claims, 5 Drawing Figures

SIMPLIFIED STRUCTURE OF TOY PHONOGRAPH

BACKGROUND OF THE INVENTION

1. Field of the Invention

The present invention relates to an improved structure of toy phonograph and, more particularly, to an improved structure of toy phonograph for use as a voice generating means for toys such as dolls, laughter bags or the like.

2. Description of Prior Art

Generally, even the most simplified toy phonograph of above described type incorporates a large number of parts such as a speaker, a record disc, tone arm, motor, springs for bringing the motor into rim-drive engagement with the record disc and for bringing the record disc into engagement with the reproducing needle on the tone arm, switches, lead wires, push rod for disengaging the record from the tone arm for allowing the latter to get back to the reproducing position by resilient means, and so on. At the same time, there is provided a long pin or shaft correctly located and vertically extending from the chassis for correctly centering the record disc, as shown, for example, a Japanese Utility Model Publication No. 25130/1977.

This impratical large number of parts not only makes the assembling of the toy phonograph difficult and troublesome, but also adversely affects the cost. In addition, it is quite difficult to apply a plastic-forming mass-producing method, which is the most popular production method for obtaining a good yield, because of difficulty in obtaining an exactly vertical posture of the centering pin around which the record disc is to be fitted and centered.

At the same time, the soldering which is indispensable in the wiring is quite troublesome and time consuming, and is not applicable to plastics which is the major material of the toy of the kind described.

Under these circumstances, the present invention aims at simplifying the structure of the toy phonograph of the kind described, so as to facilitate the manufacture and assembling, as well as to reduce the cost.

SUMMARY OF THE INVENTION

It is therefore an object of the invention to simplify the construction of rim-drive type toy phonograph.

It is another object of the invention to facilitate the production and assembling of rim-drive type toy phonograph.

It is still another object of the invention to reduce the cost of production of rim-drive type toy phonograph.

It is a further object of the invention to simplify the electric wiring of the toy phonograph of the kind described.

It is a still further object of the invention to provide a construction of the rim-drive type toy phonograph which does not necessitate the soldering of wiring at all.

It is a still further object of the invention to improve the yield of centering means for centering the record disc.

It is a still further object of the invention to provide a toy phonograph having an improved durability.

To this end, according to the invention, there is provided a rim-drive type toy phonograph in which a spring is provided for biasing a driving motor so that the latter may be brought into resilient driving contact with the rim of a record disc (or a turn table carrying the record disc) and for bringing the record disc into engagement with a reproducing stylus on a tone arm, the spring is further adapted to play a role of lead wire for power supply to the driving motor.

Also, as for means for rotatably supporting the record disc on the casing of the phonograph, the lower end of a support shaft is simply retained by the casing, while the upper end of the support shaft is suitably supported by a push rod which is adapted for depressing the record disc for allowing the tone arm to return to the starting point of reproduction.

Since the spring for biasing the motor plays also the role of lead wire for power supply, the troublesome works of electric wiring are all eliminated. Especially, the troublesome and time-consuming soldering work can be completely dispensed with. In addition, the number of parts for electric wiring can be reduced to simplify the whole structure of the phonograph, so as to render the phonograph highly durable.

In addition, by making the lower end of the support shaft for rotatably supporting the record disc retained by the chassis, while making the upper end of the support shaft supported by a push rod for causing the returning movement of the tone arm to the starting point of reproduction, it becomes unnecessary to provide a long centering pin which has been extremely difficult to form in exactly upright posture.

DETAILED DESCRIPTION OF THE PREFERRED EMBODIMENT

Figure 1:
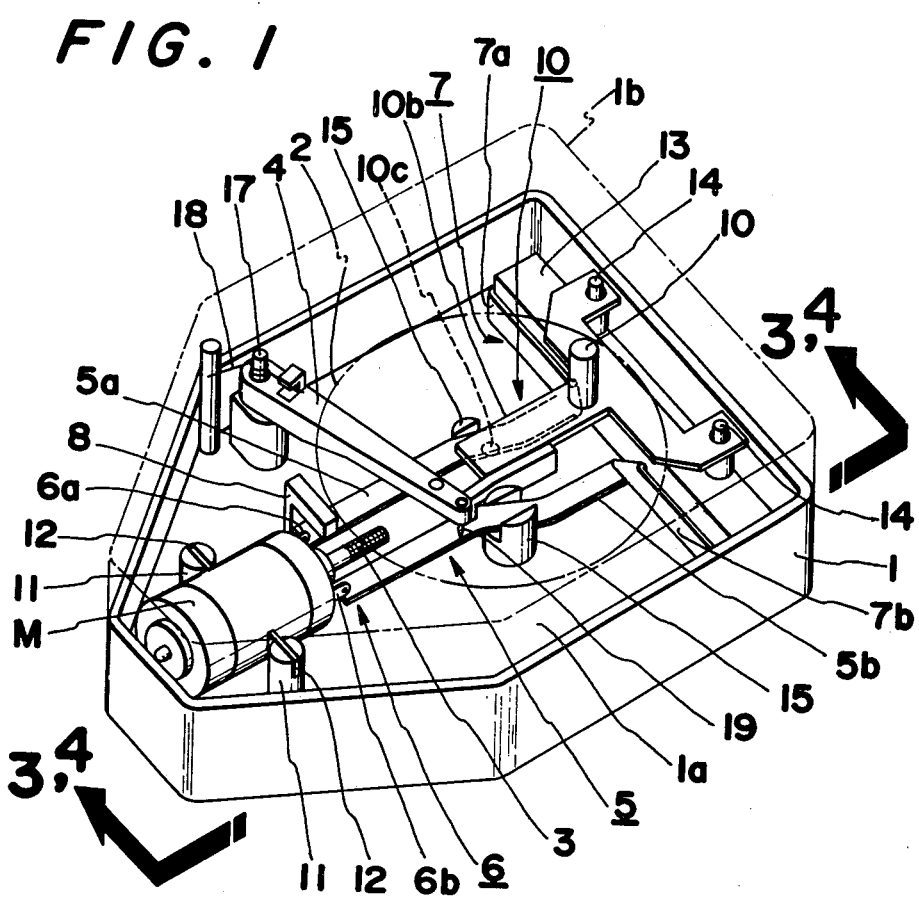
FIG. 1 is a perspective view of a toy phonograph embodying the invention with its upper cover being removed.

Referring to FIG. 1, bearings 11, 11 are provided to extend upwardly from chassis 1a at a portion of the latter close to one side of a casing 1. The bearings 11, 11 are notched at their upper ends to retain trunnions 12, 12 formed on the side of a motor M. More specifically, the trunnions 12, 12 are slided into notches of the upper ends of the bearings 11, 11, so that the motor M may be pivotally supported by these bearings. These trunnions may be formed by welding pins to the side of the motor M. However, for obtaining a sufficient mechanical strength and easy manufacturing, it is preferable to partially punch out tabs out of the plate constituting the side of the motor M, and to bend the punched out tabs outwardly to form trunnions.

Thus, the motor is pivotally supported by the chassis at portion of the latter close to one end of the casing 1, with its output shaft 3 directed toward the center of the casing 1.

At the side of the casing 1 to which the output shaft of the motors M is directed, i.e., at the side of the casing 1 opposite to the side where the motor M is pivotally mounted, there is formed a battery magazine 13. Power source terminal means, generally designated 7, are formed at both sides of the battery magazine 13. The upper surface of the battery magazine 13 is made lower than the upper edge of the casing 1, and is provided with upwardly directed pins 14,14.

A forked push rod 10 has bores in its forked ends for receiving the pins 14,14. The bores have a diameter large enough to allow a vertical swinging movement of the push rod 10, when the latter 10 is retained at these bores by the pins 14,14.

A push button 10a is formed on the push rod 10, and is projected upwardly through a later-mentioned upper cover, for an external manual operation. An extension 10b of the push rod 10 is extended toward the center of the casing 1, and is provided at its lower surface with a projection 10c. The end of the extension 10b is lowered down nearly to the surface of a record disc which will be mentioned below, and confronts the starting position for the reproduction.

Figure 2:
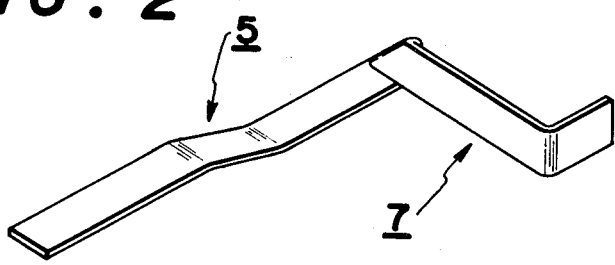
FIG. 2 is a perspective view of a unitary structure of a spring and a terminal.

The power source terminal means 7 are made of metal strips which is bent and twisted in the manner as shown in FIG. 2, and is made unitary with a leaf spring means 5.

The terminal means 7 are preferably made a resilient material having a good electrical conductivity, e.g., a copper alloy. The member consisting of the unitary terminal means 7 and leaf spring means 5 is fixed to the battery magazine 13, in such a manner that the plus and the minus sides of the terminal means 7 are connected to the corresponding sides of the battery magazine 13.

More specifically, the terminal means 7 have a plus side terminal 7a and a minus side terminal 7b which are unitary secured to respective springs 5a and 5b which are generally designated at numeral 5. These springs 5a and 5b for plus and minus side are adapted to play the role of the plus and minus side lead wires of the electric system.

Figure 5:
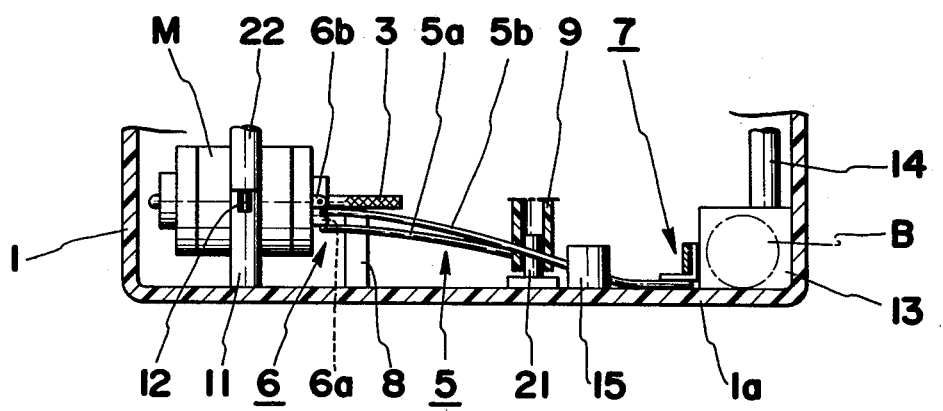
FIG. 5 is a front elevational sectional view showing a spring and a power source terminal end which are independent members.

In FIG. 5, showing an alternate embodiment, the power source terminal means 7 and the spring 5 are independent members. The spring 5 is connected to said terminal by being inserted between the under surface of terminal means 7 and the upper surface of chassis 1a.

The spring 5 is extended toward the motor M, as shown in FIG. 1, and the plus and minus side springs 5a and 5b are connected to the plus and minus sides 6a,6b of terminals 6 formed on the front surface of the motor M, respectively. Alternatively, the springs 5a,5b may be formed by wires.

The manner of connection between the spring means 5 and terminals 6 is determined depending on the position of the terminals 6 on the motor M. In case that the terminals 6 are provided on the front surface of the motor M as illustrated, the spring means 5 will engage the terminals 6 to lift the terminals 6 upwardly. To the contrary, when the terminals 6 are positioned behind the trunnions 12,12, the spring means 5 are made to engage the terminals 6 so as to depress the latter downwardly. The latter case is neglected from the drawings.

Figure 3:
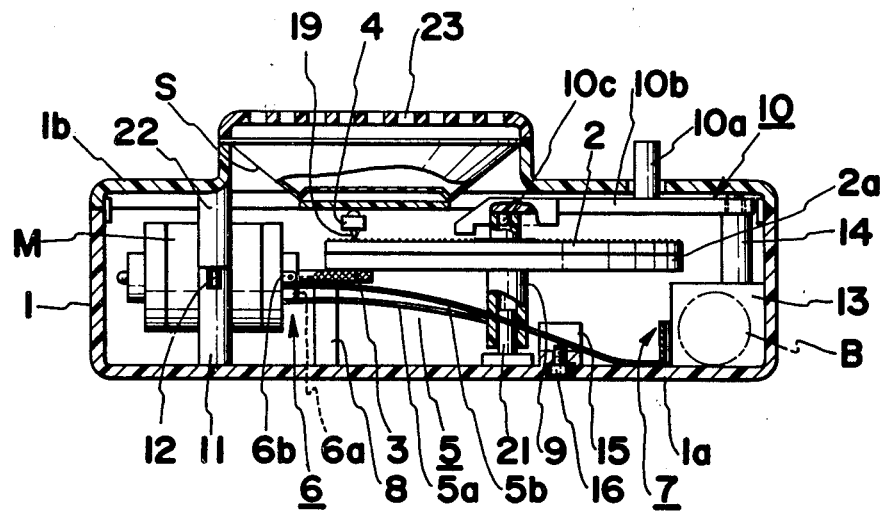
FIG. 3 is a front elevational fragmentary sectional view taken along the line 3,4—3,4 of FIG. 1.

When the spring means 5 are arranged to lift the terminals 6 as illustrated, the spring means 5 are supported at their intermediate portions by supporting columns 15,15 provided on the chassis 1a. The height of the supporting columns 15,15 is adjustable by means of adjusting screws 16 which are driven through the bottom wall of the chassis 1a from lower side of the latter as shown in FIG. 3.

Thus, the motor M is biased by the spring means 5, so that its output shaft 3 is normally directed upwardly.

A stopper 8 provided on the chassis 1a is adapted to limit at its upper end the upward movement of the spring 5a which acts to bias the motor M upwardly. Therefore, in the course of upward movement of the motor M, the spring 5a comes to be retained by the stopper 8. Then, the motor M is further swung upwardly, by the force of the other spring 5b, so that the spring 5a is disconnected from the terminal 6a of the motor M.

Turning again to FIG. 1, a tone arm 4 is pivotally supported by a pin 17 provided on the chassis 17, and is biased by a spring 18, in such a manner that its end is moved toward the starting point of the reproduction. A record disc 2 is illustrated in FIG. 1 as an imaginary circle. The end of the tone arm 4 carries at its lower side a reproducing needle or stylus 19 which engages the recording surface of the record disc 2.

An upper cover 1b as shown in FIG. 3 is fitted to the upper side of the casing 1. As will be most clearly seen from FIG. 3, a centering pin 21 is projected from the chassis 1a so as to be received by a sleeve shaft 9 of the record disc 2. Needless to say, the sleeve shaft 9 is free to move in the axial and rotational directions, relatively to the pin 21. The sleeve shaft 9 is formed unitarily with the record disc 2, for correctly centering the latter in the casing 1.

In the illustrated embodiment, the record disc 2 is formed integrally with a so-called turn table, and is provided at its peripheral surface with a rim 2a made of a soft and web-like rubber ring. Due to the provision of this rim 2a, the peripheral edge of the record disc 2 assumes a form of a skirt which extends slightly downwardly from the level of the lower face of the main part of the record disc 2.

The sleeve shaft 9 receives at its upper end a projection 10c formed on the lower face of the push rod 10, so that the push rod is prevented from being inclined, thereby to maintain the horizontal posture of the record disc 2. The push button 10a of the push rod 10 projects upwardly through the upper cover 1b. In the drawings, symbol B denotes batteries as a power source.

Columns 22 formed on the back surface of the upper cover are adapted to oppose to respective one of the bearings 11,11, so as to close the notches of the bearings 11,11 receiving the trunnions 12,12, when the upper cover 1b is properly fitted.

A speaker S is secured to the upper cover 1b and is directed upwardly. Slit 23 is formed to allow the outward propagation of the sound.

The bottom of the speaker S is formed with a flat vibration plate of a diaphragm.

Since the motor M is biased by the spring 5 to move its output shaft 3 upwardly, as stated before, the output shaft 3 is brought into contact with the rim 2a of the record disc 2 from the lower side of the latter, to lift up the same.

The end of the tone arm 4 which is pivotally supported in the described manner is located between the record disc 2 and the speaker S. Therefore, the record disc 2 is lifted by the force of the spring 5 toward the tone arm 4, to bring its recording surface into engagement with the stylus 19. The tone arm 4 in turn is borne by the lower surface of the speaker S, to prevent the further upward movement of the record disc 2.

As the motor M is energized, the record disc 2 is driven, so that the tone arm 4 is made to swing toward the final point of the reproduction, keeping a sliding contact with the lower surface of the speaker S. In the illustrated embodiment, the final point of the reproduction resides in the radially outermost portion of the record disc 2.

Figure 4:
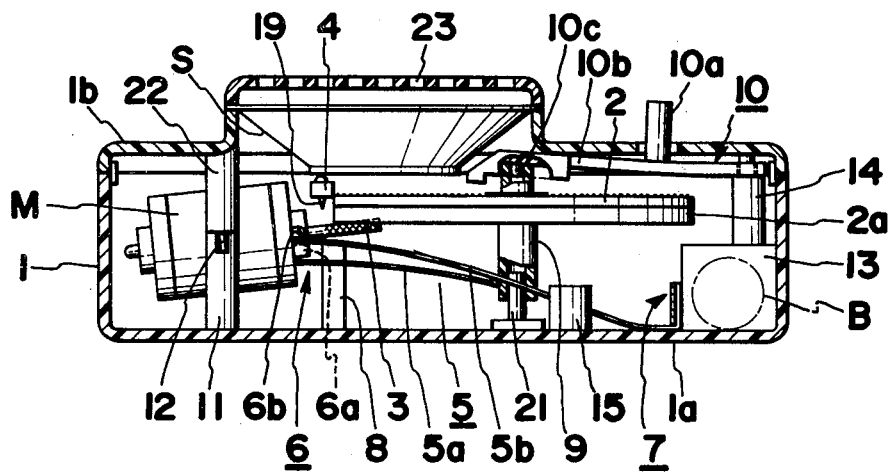
FIG. 4 is a front elevational sectional view similar to FIG. 3, showing the state in which the switch is turned to off.

The vibration picked up by the stylus is then transmitted to the speaker S and is amplified to an audio level by the speaker S. When the reproduction is over, the tone arm 4 is disengaged from the recording surface of the record disc 2, as shown in FIG. 4, and is swung radially outwardly from the record disc 2. Then, since the force exerted by the tone arm 4 through the stylus 19 on the record 2 to withstand the biasing force of the spring 5 has been decreased, the record disc 2 is moved upwardly toward the bottom of the speaker S, and will be stopped by the push rod 10. In this state, the sleeve shaft 9 is also lifted to move the push rod 10 into contact with the back face of the upper cover 1b.

In the course of this upward movement of the record disc 2, the spring 5a will be stopped by the stopper 8. Meanwhile, the other spring 5b continues to swing the motor M upwardly, so that the spring 5a, which plays the role of a lead wire is disengaged from the terminal 6a of the motor M, to open the power source circuit. Consequently, the power supply to the motor M is interrupted to stop the rotation of the record disc 2. In this state, the tone arm is retained on the outer peripheral portion of the record disc 2, so that it is not ready for the reproduction.

However, as the push button 10a of the push rod 10 is depressed from the outside of the casing 1, against the spring means 5, the tone arm 4 is freed and moved automatically by the spring 18 toward the center of the record disc 2, until it comes to abut the end of the push rod 10, i.e., back to the starting point of the reproduction. At the same time, the spring 5a is again brought into contact with the terminal 6a of the motor M to complete the power source circuit, so that the motor M is restarted to commence the reproduction in the manner as shown in FIG. 3.

It will be seen from the foregoing description of the preferred embodiment that the construction of the toy phonograph is greatly simplified. Especially, a reasonable unitary construction of the electric system and the mechanical part ensures sufficient strength of the whole device, as well as a much facilitated production and assembly resulting in a reduced cost of manufacture.

I claim:

1. A toy phonograph having a record disc rotatably and axially movably pivoted on a center pin carried by a chassis of a casing, a motor having an output shaft and secured by trunnion bearings to said chassis for a pivotal movement in the direction which intersects the axis line of said output shaft, so as to bring said output shaft, into a rim-driving engagement with said record disc from the back side of said record disc, a speaker provided above and spaced from said record disc, and a tone arm normally biased by spring toward the starting position of reproduction and adapted to be swung within the space between said speaker and said record disc keeping a sliding contact with said speaker, characterized in that spring means for biasing said motor to bring said output shaft into contact with said record disc, which are made of electroconductive material and are retained at their one end by terminals of said motor, and at their other ends connected to power source terminals, so that spring means plays the role of source lead wires.

2. A toy phonograph as claimed in claim 1, wherein said spring means playing the role of the lead wires are formed unitarily with said power source terminals.

3. A toy phonograph as claimed in claim 1, wherein said spring means playing the role of lead wires are formed unitarily with said power source terminals, with bent or shaped leaf springs.

4. A toy phonograph as claimed in claim 1, wherein said spring means playing the role of the lead wire are formed unitarily with said power source terminals, with not bent shaped wire springs.

5. A toy phonograph as claimed in claim 1, wherein said spring means playing the role of lead wires include a plus side and minus side springs, and a stopper is disposed on the way of movement of one of motor terminals, by which one of said springs is adapted to be stopped during the movement of said motor to bring said output shaft into contact with said record disc, so that one spring may be disengaged from said terminal of said motor, whereby said one spring can play the role of a source switch to open and close the power source circuit.

6. A toy phonograph as claimed in claim 1, wherein a sleeve shaft for rotatably supporting said record disc is rotatably pivoted on said pin carried by said casing, said sleeve shaft being supported at its upper end by a push rod which extends over the record disc and at its lower end by said chassis via said pin, said push rod being so associated with said record disc to axially move said record disc by its pivotal movement to and from the surface of said record disc.

* * * * *